United States Patent [19]

Galloway

[11] Patent Number: 5,251,525
[45] Date of Patent: Oct. 12, 1993

[54] CONVERSION KIT FOR PORTABLE BANDSAW

[76] Inventor: Ronald G. Galloway, 87 Tappan St., Baldwinsville, N.Y. 13027

[21] Appl. No.: 931,359

[22] Filed: Aug. 18, 1992

[51] Int. Cl.⁵ .................... B23D 55/02; B27B 13/02
[52] U.S. Cl. ........................................ 83/574; 83/788; 30/296.1; 30/374; 30/380
[58] Field of Search ................ 83/574, 788; 30/296.1, 30/374, 380

[56] References Cited

U.S. PATENT DOCUMENTS

| | | | |
|---|---|---|---|
| 2,711,195 | 6/1955 | Hill | 83/788 |
| 3,961,550 | 6/1976 | Oliver et al. | 83/574 |
| 4,193,192 | 3/1980 | Cortez | 30/380 |
| 4,677,887 | 7/1987 | Martin | 83/788 |
| 4,711,032 | 12/1987 | Rickmers et al. | 30/380 X |
| 4,823,666 | 4/1989 | Galloway | 83/788 |

FOREIGN PATENT DOCUMENTS

373901  6/1932  United Kingdom ........... 83/788

Primary Examiner—Frank T. Yost
Assistant Examiner—Raymond D. Woods
Attorney, Agent, or Firm—Wall and Roehrig

[57] ABSTRACT

An apparatus and a cradle for converting a portable bandsaw into an upright table saw. The saw includes a casing, a pair of spaced apart pulleys mounted in opposed housings on the casing for rotatably supporting an endless saw blade, and a trigger guard attached to the back of the casing behind the motor housing. The stand includes a horizontally disposed base plate, a vertically disposed pedestal and a short, narrow facing piece mounted on the base plate, so that the L-shaped trigger guard, when placed in an upright position, will snugly fit, remaining upright, and a bracket situated near the top of the pedestal which serves to retain the upper portion of the bandsaw. A trigger actuating means is mounted on the pedestal for holding the trigger of a saw suspended in the cradle in either an on or an off position.

7 Claims, 7 Drawing Sheets

CONVERSION KIT FOR PORTABLE BANDSAW

BACKGROUND OF THE INVENTION

This invention relates to a simple, inexpensive conversion kit for mounting a portable bandsaw in a stationary, upright position while allowing the user thereof to retain the trigger of the bandsaw in a desired position without having to physically hold down the trigger while operating the bandsaw, leaving both hands free for guiding a workpiece. The conversion kit comprises a cradle, a pair of bandsaw pulley covers, and a saw blade cover.

Devices have been described which will hold a portable bandsaw in an upright position thereby converting the bandsaw to a stationary tool. These devices suffer from one or more of a number of drawbacks, including (1) relative lack of stability of the bandsaw (2) complexity and expense of production, and (3) no provision for maintaining a depressed bandsaw trigger, leaving only one hand free for guiding the workpiece.

U.S. Pat. No. 4,677,887 to Martin discloses a stand which has a base plate, and two spaced apart vertical supports which extend almost to the center of a portable bandsaw when the saw is fixed in an upright position between the vertical supports. These supports are kept short so that the exposed or working part of the blade can be accessed to a workpiece. This configuration, however, may suffer from instability as there is no support for more than half of the weight and volume of the bandsaw. In addition, it is awkward for a user to depress the trigger which appears on most modern bandsaws. Furthermore, the user must normally hold the trigger in a depressed position in order to continue using the bandsaw; thus only one hand is free for guiding the workpiece.

U.S. Pat. No. 3,961,550 to Oliver involves an apparatus for converting a portable bandsaw into a stationary one. The saw is strapped in a special bench fixture involving a yoke-like base for receiving the saw motor housing. The housing is affixed securely via straps. Jack screws are vertically mounted in the base and pass upwardly to engage a special table that is secured to the saw frame. When the jack screws are tightened down, they provide additional rigidity to the saw. This particular feature is limited for use only in applications where the saw motor housing projects perpendicularly from the side wall of the frame and also requires the use of a special table.

U.S. Pat. No. 4,823,666 to Applicant teaches a universal stand for a portable bandsaw. Firm affixation of a saw to the stand is achieved by removing the hand knob of the saw from the casing and threading a locking screw located in the upper part of the removable arm of the stand into the vacated hole. This securely pulls the casing of the bandsaw against the upper arm and provides a very firm support. This device, however, is comprised of a fair number of parts and may be somewhat expensive to build. A cradle for a bandsaw may be desired which requires fewer castings and is less expensive. This is especially true if the versatility of the '666 device with respect to different bandsaw models is not required.

SUMMARY OF THE INVENTION

It is therefore a primary object of the present invention to provide an easy to make, inexpensive conversion kit for holding a bandsaw which is normally used in the horizontal position and thereby converting it from a portable tool to an upright table saw.

It is a further object of the present invention to provide an easy to make, inexpensive conversion kit for holding a bandsaw and thereby converting it from a portable tool to an upright table saw, which has a trigger actuating mechanism adapted to depress and hold the saw trigger at an "on" setting, thereby freeing both of the operator's hands.

It is a further object of the present invention to provide and easy to make, inexpensive conversion kit for holding a bandsaw and thereby converting it from a portable tool to an upright table saw, which protects the user from the saw blade outside of the work area.

These and other objects of the present invention are attained by means of a conversion kit that includes a cradle for supporting a portable bandsaw of the type having a motor mounted in a casing over the saw blade so that the axis of the motor is generally parallel with the saw blade and a trigger mounted in a trigger guard behind the motor, the cradle comprising a horizontally disposed base, a vertically disposed pedestal mounted on the base, a short, narrow facing piece mounted on the base, parallel to the pedestal and at a distance such that the bandsaw, when placed in an upright position, will snugly fit between the pedestal and the facing piece, a saddle piece, fitted between the pedestal and the facing piece and curved to follow the contours of the bottom surface of the bandsaw, a bracket, situated near the top of the pedestal and serving to retain the upper portion of said bandsaw so that the bandsaw remains firmly fixed in an upright position in the cradle with the trigger guard positioned beneath the motor directly over the base whereby an exposed section of the saw blade passes vertically through a workstation, and a trigger actuating device mounted on the pedestal for holding the trigger of a saw suspended in the cradle at a desired position. The kit further includes a table with a slotted opening in its surface to allow the passage of the saw blade, that can be attached to a saw suspended within the cradle, and may be secured to the casing in such a way as to position the table adjacent to the work station. The kit also includes two snap on pulley covers and a straight blade cover to protect the user against injury.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 2:
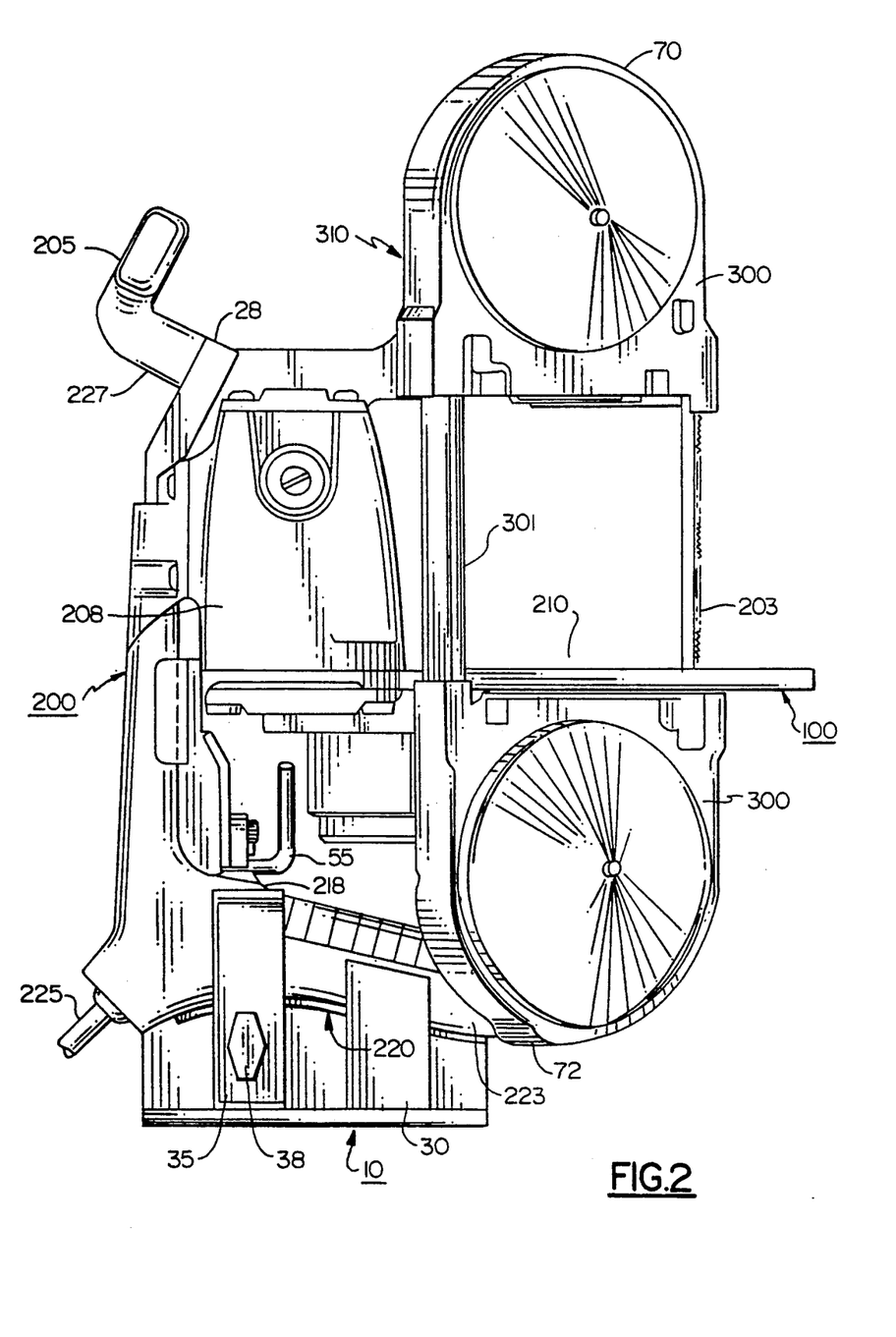
FIG. 2 is a front view of the conversion kit of FIG. 1 showing, furthermore a bandsaw held upright therein and the additional components of saw pulley covers and straight blade cover and work-table.
Figure 3:
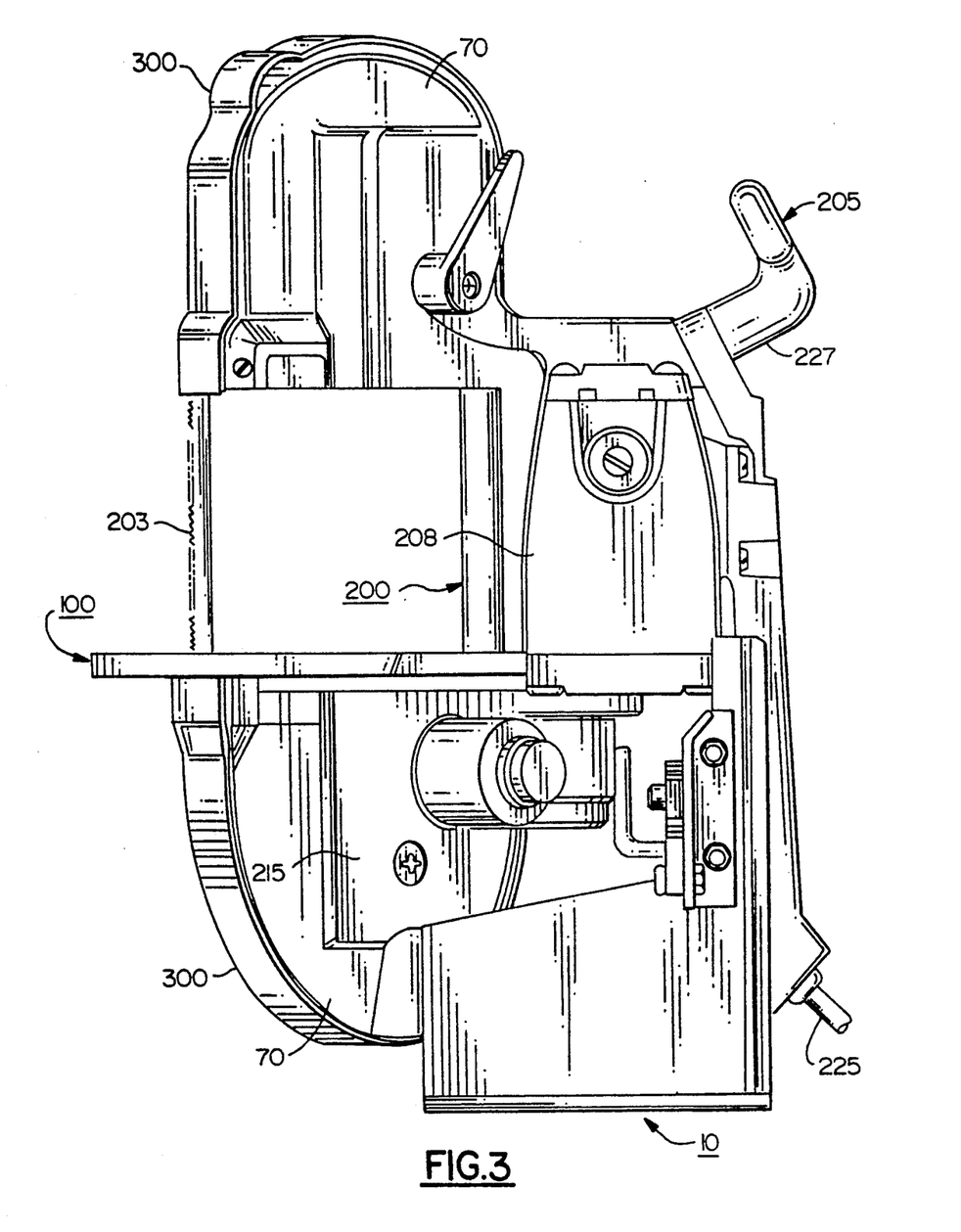
FIG. 3 is a back view of the conversion kit and bandsaw of FIG. 2.

Referring now to FIGS. 2 and 3, there is shown a conventional portable bandsaw 200 that is mounted within a cradle 10 of a conversion kit that embodies the teachings of the present invention. The present bandsaw, which is representative of modern bandsaw design, consists of a main casing 215 which is attached to a pair of opposing pulley housings 70 and 72. The main casing, which forms the backbone of the saw, is typically fabricated from metal, plastic or the like. An endless saw blade 203 is suspended between the pulleys so that an exposed portion of the blade is caused to move through a workstation 210. A variable speed motor 208 is centrally supported in the main casing along the backbone of the tool. As will be explained in greater detail below, the cradle is arranged to support the bandsaw in an upright position so that the exposed section of blade 203 passing through the workstation 210 is held in vertical alignment. This allows the operator of the bandsaw to benefit from both the advantages of a portable band saw such as portability, light weight and flexibility, and the advantages of a table saw that provides stability, better control of the workpiece, and the requirement of less physical effort.

A hand engageable L-shaped trigger guard 220 is mounted on the back of the main casing immediately behind the motor housing 208. The guard includes a hand grip 223 that contains a spring biased depressible trigger 218 that is normally engaged by the index finger of the operator's gripping hand when the tool is being used in a portable manner. An electric cord 225 is passed into the trigger guard and is connected to a motor control switch (not shown) which is actuated by trigger 218. Depressing the trigger 218, which is normally spring loaded in an off position, provides electrical current to the motor.

A top grip 205 is typically located at the front of the main machine casing to provide a second, stabilizing handgrip for the operator. Normally, the operator will grasp the hand grip of the trigger guard with one hand and the top grip with the other hand and thus guide the exposed section of the saw blade 203 into a workpiece. As can be seen, the center of gravity of the bandsaw is located between the two grips thereby making the tool more easily maneuverable and providing greater safety for the operator. In the present application where the saw is mounted within the cradle 10, the extension 227, to which the top grip 205 is attached, slips behind the bracket 28 of the cradle 10 and serves to help stabilize the bandsaw 200 on the cradle.

Figure 1:
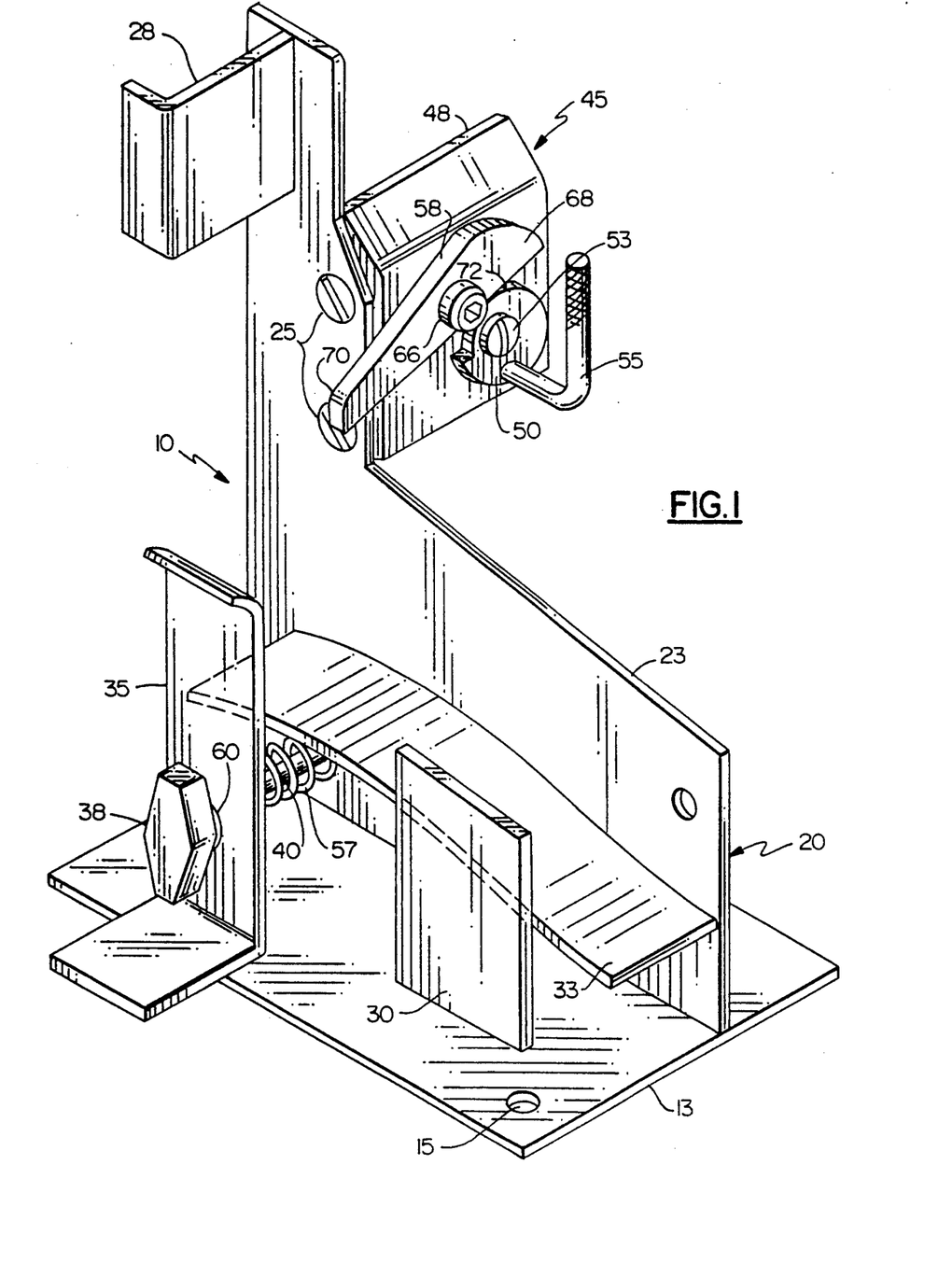
FIG. 1 is a perspective view of showing one embodiment of the cradle portion of a conversion kit for a portable bandsaw.

The first embodiment of the cradle portion 10 of the conversion kit, shown in FIG. 1, includes a horizontally disposed base plate 13 and, fixedly secured to the base plate, both a vertically disposed pedestal 20 and a facing piece 30 which is positioned parallel to the vertically disposed pedestal. The cradle may be mounted on a work bench or other convenient work surface by use of any applicable fastening device through a hole 15. Between the pedestal 20 and the facing piece 30, and fixed securely to both, is a saddle fixture 33, which is contoured to complement the outer surface of the trigger guard 220 of the bandsaw 200 which will rest thereupon. On the same side of the facing piece 30, and also opposing and parallel to the pedestal 20 is a clamping piece 35 which may be secured against a bandsaw, by tightening the clamping piece 35 against the bandsaw 200. In the first embodiment this is accomplished by means of a rod 57 which extends through the pedestal 20, is inserted through a spring 40, and a hole 60 through the clamping piece 35, and may be tightened by the use of a knob 38. This allows the cradle to be used with a variety of different bandsaws and still provide extra stability to the bandsaw.

At the top of the pedestal 20, extending perpendicularly therefrom and toward the clamping piece 35 is a bracket 28 which faces in an outward direction from the bandsaw 200 and which is capable of receiving the top grip 205 of the bandsaw 200 and thus more firmly retaining said bandsaw. The bandsaw is thus stabilized both at its top and bottom and is less likely to fall or tip over.

Attached to the pedestal is a trigger actuating mechanism which may be used to depress and hold at any desired setting the trigger 218 of the bandsaw. Without such a mechanism the operator would be required to constantly manually maintain the trigger in the desired position, an awkward and potentially dangerous maneuver which would allow only one free hand for guiding the workpiece with respect to the bandsaw. In the first embodiment, this trigger actuating mechanism is mounted on a plate 48 which, in turn is mounted on the pedestal 20 by means of screws 25 through holes in said pedestal. The actuating mechanism includes a lever arm 58 secured by conventional means (which allow for its rotation) to the plate 48 and a camming device 50, also secured to the plate 48 by conventional means which allow for its rotation. The camming device 50 is affixed immediately below the lever arm 58. The front end 70 of the lever arm extends into the interior region of the cradle so that it is able to engage the trigger of the saw mounted therein. The back end 68 of the arm is arranged to contact the cam face 72 of the camming device. The camming device has an L-shaped lever arm 55 extending perpendicular and then bending parallel thereto by which the unit can be turned about the pivot 53.

The cam face 72 of the camming device is generated so that the unit will hold the lever arm in any desired position against the biasing action of the trigger. Accordingly, when the mechanism is used in conjunction with a variable speed saw, the trigger can be placed at any setting needed to maintain the saw blade at a desired speed. In the case of a single speed tool, the arm can be moved to a position so as to set the saw at an "on" condition whereby the saw will run continuously at the set speed until the actuating mechanism is moved to a release position.

As illustrated in FIG. 3 the present conversion kit is further equipped with a work table 100 that can be attached to a saw suspended within the cradle. As described in my prior Pat. No. 4,823,666, the table has a slotted opening which allows for the passage of the saw blade and a locking device for securing the table to the saw casing in such a way as to position that table adjacent to the work station. The teaching of the No. 4,823,666 patent are herein incorporated by reference as these teaching relate to the table and its associated locking device.

Figure 7:
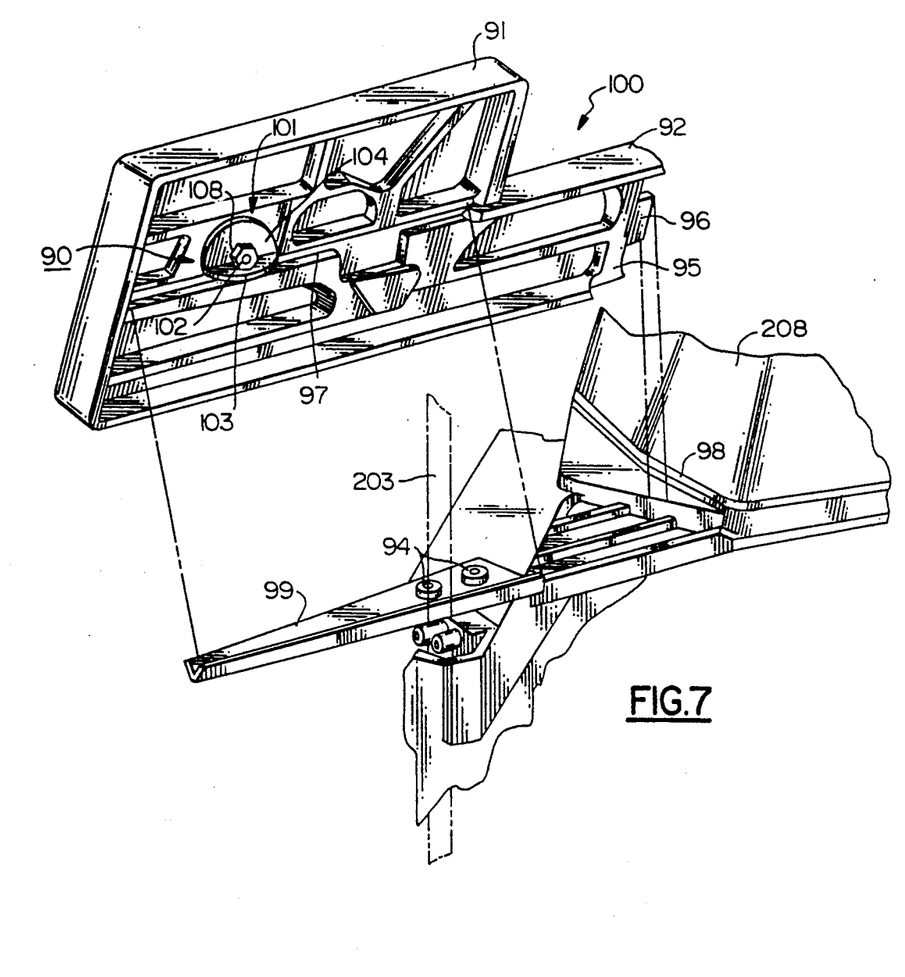
FIG. 7 is an enlarged partial perspective view of the table of the conversion kit showing the clamping mechanism in detail.
Figure 8:
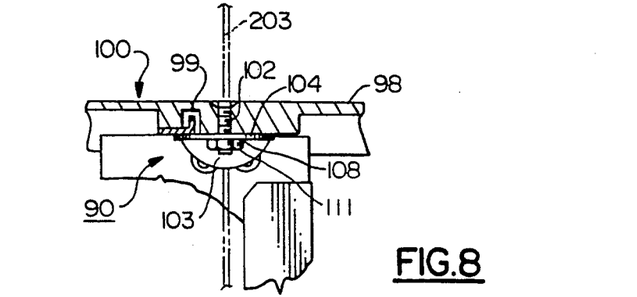
FIG. 8 is a partial sectional view of the table of the conversion kit showing the clamping mechanism in detail.

As illustrated in FIG. 7, table 100 includes a wide front section 91 that is attached to a narrower back section 92. The two sections combine to provide a flat top surface 98 which can be used as a stable support platform for a workpiece. The table contains a slotted opening 93 through which the saw blade is free to move when the table is attached to the saw in the manner explained below. In this particular embodiment of the invention, the guide member is an angular shaped element that is attached to the tool casing by means of a pair of screws 94–94. The underside of the table contains a groove 97 in which the guide member can be securely seated in assembly. In addition, the end wall 95 of the back section of the table is provided with an outwardly disposed boss 96 that is arranged to pass into an air vent 98 found in the motor housing 208. With the guide member securely seated in groove 97, the table is clamped to the guide member by means of a clamping mechanism generally referenced 90. The clamping mechanism is an annular locking disk 101 that is pivotally mounted in the underside of the table by screw 102 that is located adjacent to the guide receiving groove 97. A section of the disk is turned downwardly at ninety degrees to provide a thumb tab 103 which, when positioned as shown in FIG. 7, allows the guide member to pass freely into the groove 97. Turning the disk about the pivot screw will bring the main body 104 of the locking disk over the guide member. A spring wave washer 108 is placed under the nut 111 (FIG. 8) which bears against the lower face of the locking disk. Sufficient pressure is exerted upon the wave washer by the nut so that the locking disc is held in any desired position that it is placed. The disk can thus be rotated by the use of the thumb tab between a table locking position and a table release position.

The conversion kit also includes a set of shields 310 which protect the user from accidental contact from the saw blade by leaving it exposed only in the working area rather than around the entire periphery. The set consists of two snap over plastic pulley shields 300–300 which are shaped to fit in place over the pulley housings and a channel shaped plastic protector 301 that snaps into the two shields to cover the vertical run of the blade which is not in the work area.

Figure 4:
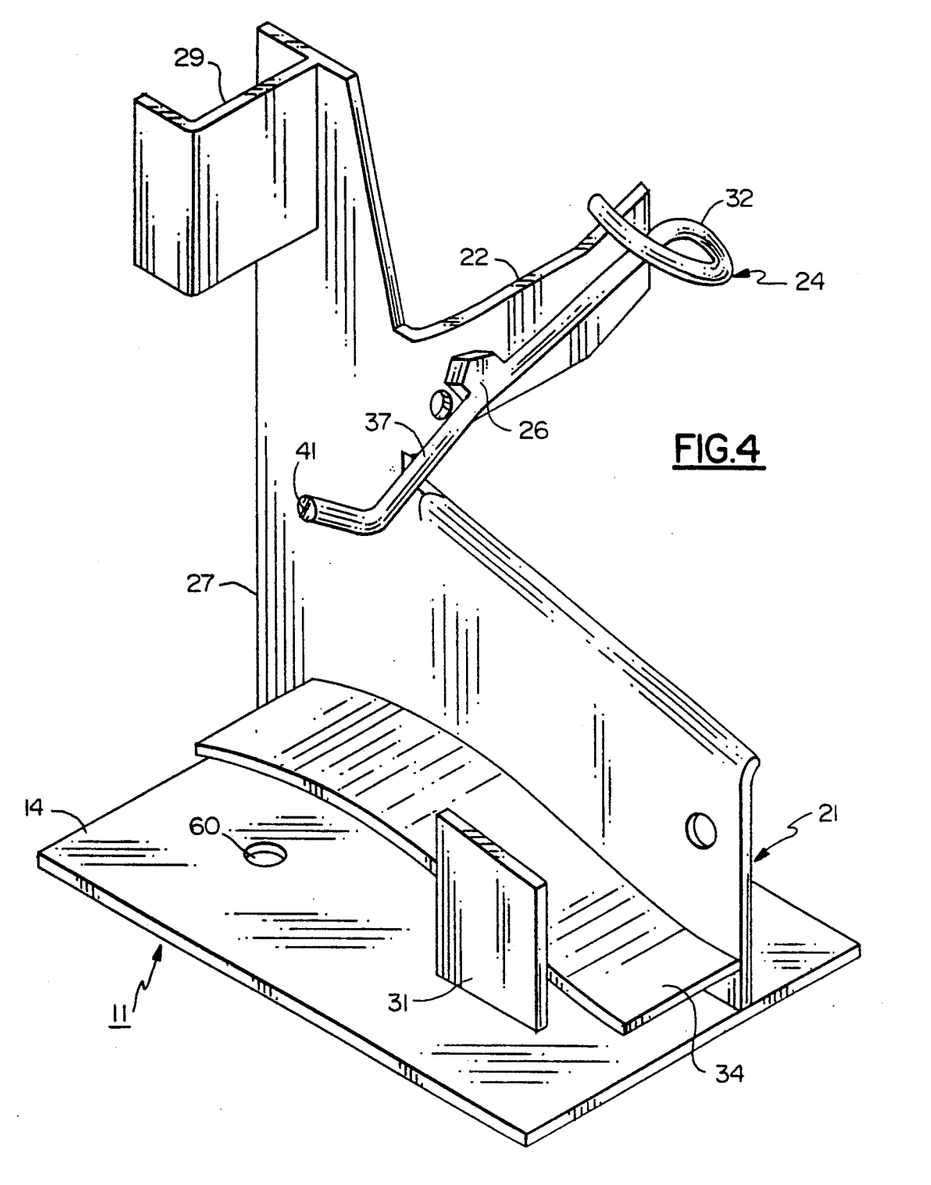
FIG. 4 is a perspective view of a second embodiment of the instant invention.
Figure 5:
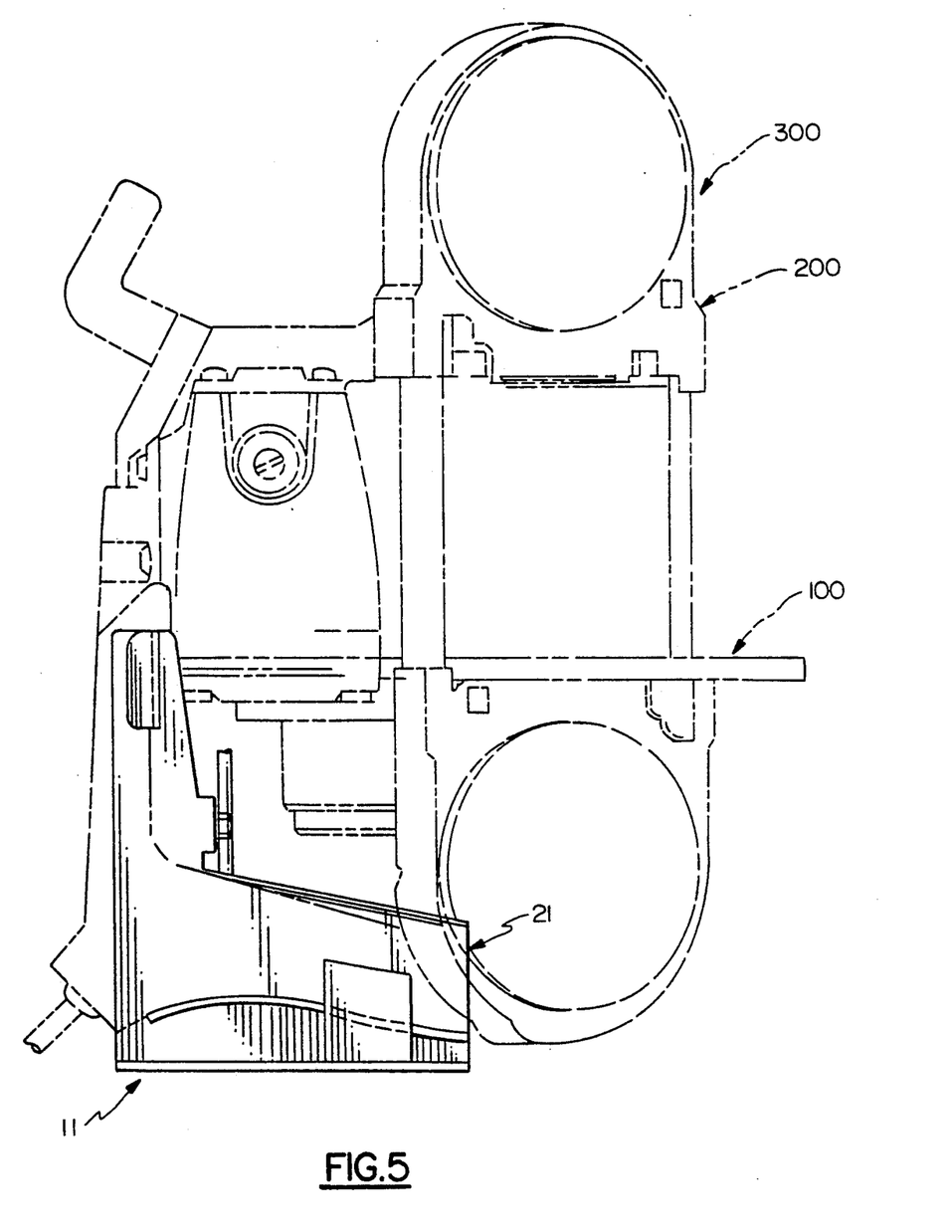
FIG. 5 is a front view of the conversion kit of FIG. 1 showing, in phantom, a bandsaw held upright therein and the additional components of straight blade cover, saw pulley covers and work-table.
Figure 6:
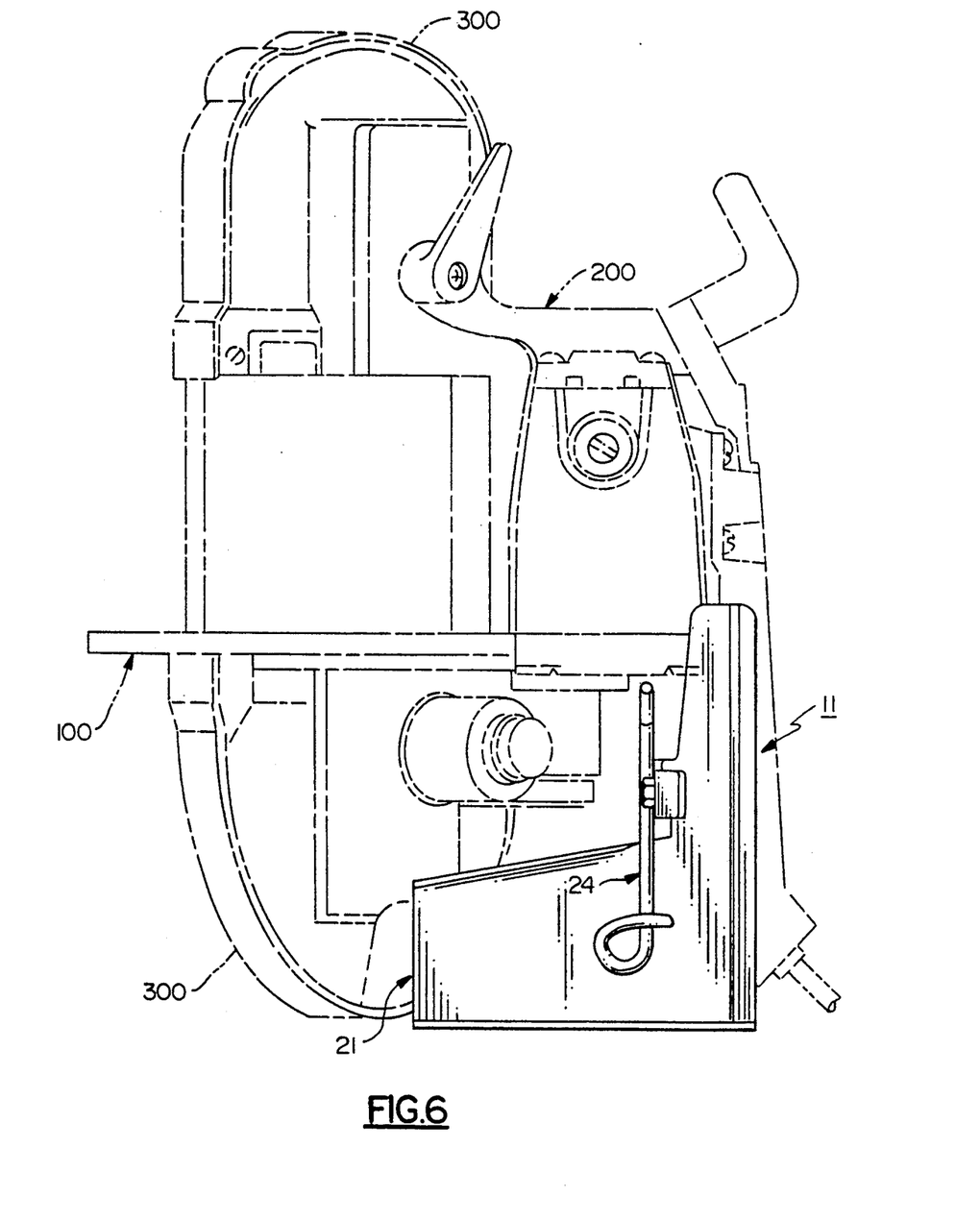
FIG. 6 is a back view of the conversion kit of FIG. 1 showing, in phantom, a bandsaw held upright therein.

The second embodiment of the conversion kit, shown in FIGS. 4, 5 and 6, is very easily and inexpensively constructed. In this embodiment the cradle 11, comprises a horizontally disposed base plate 14 and, fixedly secured to the base plate, both a vertically disposed pedestal 21 and a facing piece 31 which is positioned parallel to the vertically disposed pedestal. The cradle may be mounted on a work bench or other convenient work surface by use of any applicable fastening means through a hole 60. Between the pedestal 21 and the facing piece 31, and fixed securely to both, is a saddle piece 34 which is contoured to complement the outer surface of the trigger guard 220 of the bandsaw 200 which will rest thereupon, as shown in FIGS. 5 and 6.

At the top of the pedestal 21 extending perpendicularly therefrom and toward the facing piece 31 is a bracket 29 which faces in an outward direction from the bandsaw 200 and which is capable of receiving the top grip 205 of the bandsaw 200 and thus more firmly retaining said bandsaw. The bandsaw is thus stabilized both at its top and bottom and is less likely to fall or tip over.

Between the bracket 29 and the base 27 of the pedestal 21 is a pedestal arm 22 which is fabricated of a piece with the pedestal, and bent to extend perpendicularly to the main panel of the pedestal, but away from the facing piece. Attached to the pedestal arm 22 is a trigger actuating mechanism which may be used to depress and hold in an ON position the trigger 218 of the bandsaw.

In the second embodiment, this trigger actuating mechanism is rotatably mounted on the pedestal arm. The actuating mechanism includes a bent rod 24. The front end 41 of the bent rod is bent upward and extends into the interior region of the cradle so that it is able to engage the trigger of the bandsaw mounted therein. The back end 32 of the bent rod is bent into loop with a portion of the rod extending beyond the loop. The terminal portion of the rod thus impinges on the top of the pedestal arm so that when the front end engages the bandsaw trigger the upward pressure trigger forces the rod end against the pedestal arm, and the resulting back force holds the trigger in a depressed position. Moving the loop portion horizontally to the base releases the rod end from contact with the top of the pedestal arm, resulting in unopposed upward pressure on the bottom of the rod by the trigger, and allows the trigger to return to the OFF position.

It can be thus seen that this second embodiment is easily fabricated from a small number of parts, many of which are items of standard production.

While this invention has been explained with reference to the structure disclosed herein, it is not confined to the details set forth and this application is intended to cover any modifications and changes as may come within the scope of the following claims:

What is claimed is:

1. A cradle for supporting a portable bandsaw, said bandsaw having an upper portion and being of the type having a motor having an axis, said motor being mounted in a casing over a saw blade, so that the axis of the motor is generally parallel with said saw blade and a trigger mounted in an L-shaped trigger guard having a hand grip forming one leg thereof and located behind the motor, said cradle comprising:
   a horizontally disposed base,
   a vertically disposed pedestal, having a top, said pedestal being mounted on said base,
   a short, narrow facing piece mounted on said base, parallel to said pedestal and at a distance such that said L-shaped trigger guard, when placed in an upright position, will snugly fit between said pedestal and said facing piece,
   a saddle means, fitted between said pedestal and said facing piece and contoured to complement the hand grip of the trigger guard,
   a bracket means, situated near the top of said pedestal said bracket means serving to retain the upper portion of said bandsaw so that said bandsaw remains firmly fixed in an upright position in said cradle with said trigger guard positioned beneath the motor directly over said base whereby an exposed section of said saw blade passes vertically through a work station, and
   a trigger actuating means mounted on said pedestal for holding the trigger of said bandsaw suspended in the cradle in either an on or an off position.

2. The cradle for supporting a portable bandsaw according to claim 1 that further includes a clamping means opposite to said pedestal and adjacent to the base, which is adjustable to fit snugly against the trigger guard, providing further support and stability to said bandsaw.

3. The cradle for supporting a portable bandsaw according to claim 1 that further includes means for rigidly attaching the base of the cradle to a support means.

4. The cradle for supporting a portable bandsaw according to claim 1 where the trigger actuating means additionally holds the trigger of the bandsaw suspended in the cradle in any desired position.

5. The cradle for supporting a portable bandsaw according to claim 1 having, additionally affixing means incorporated into the base whereby the base plate is detachably securable to a support surface.

6. An apparatus for converting a portable bandsaw, said bandsaw having an upper portion and being of the type having a motor having an axis, said motor being mounted in a casing over a saw blade, so that the axis of the motor is generally parallel with said saw blade and a trigger mounted in an L-shaped trigger guard having a hand grip forming one leg thereof and located behind the motor, to an upright table saw said apparatus for converting a portable bandsaw comprising:

a horizontally disposed base, a vertically disposed pedestal, having a top, said pedestal being mounted on said base, a short, narrow facing piece mounted on said base, parallel to said pedestal and at a distance such that said L-shaped trigger guard, when placed in an upright position, will snugly fit between said pedestal and said facing piece, a saddle means, fitted between said pedestal and said facing piece and contoured to complement the hand grip of the trigger guard, a bracket means, situated near the top of said pedestal said bracket means serving to retain the upper portion of said bandsaw so that said bandsaw remains firmly fixed in an upright position in said apparatus with said trigger guard positioned beneath the motor directly over said base whereby an exposed section of said saw blade passes vertically through a work station, a trigger actuating means mounted on said pedestal for holding the trigger of the bandsaw suspended in the apparatus in either an on or an off position, a work table having a slotted opening therein through which one run of said saw blade passes, and clamping means for securing the table to the casing to horizontally position said table adjacent to said work station.

7. The apparatus for converting a portable bandsaw to an upright table saw according to claim 6 that further includes two pulley housing covers which are shaped to fit over pulley housings on said bandsaw and thus afford protection for a user of the bandsaw.

* * * * *